Dec. 12, 1939.  J. M. RICHARDS  2,182,971

SKYLIGHT OR FLOORLIGHT CONSTRUCTION

Filed Sept. 17, 1937   2 Sheets-Sheet 1

Inventor.
Joshua M. Richards
by Charles W. McDowell
his atty.

Dec. 12, 1939.  J. M. RICHARDS  2,182,971
SKYLIGHT OR FLOORLIGHT CONSTRUCTION
Filed Sept. 17, 1937   2 Sheets-Sheet 2
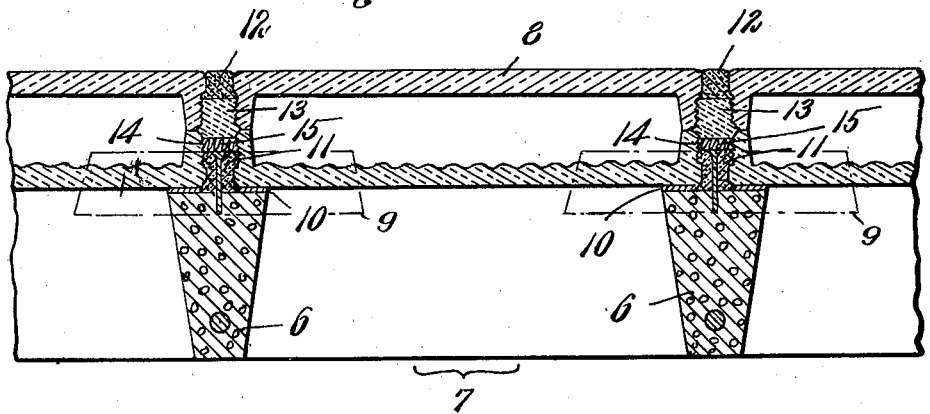
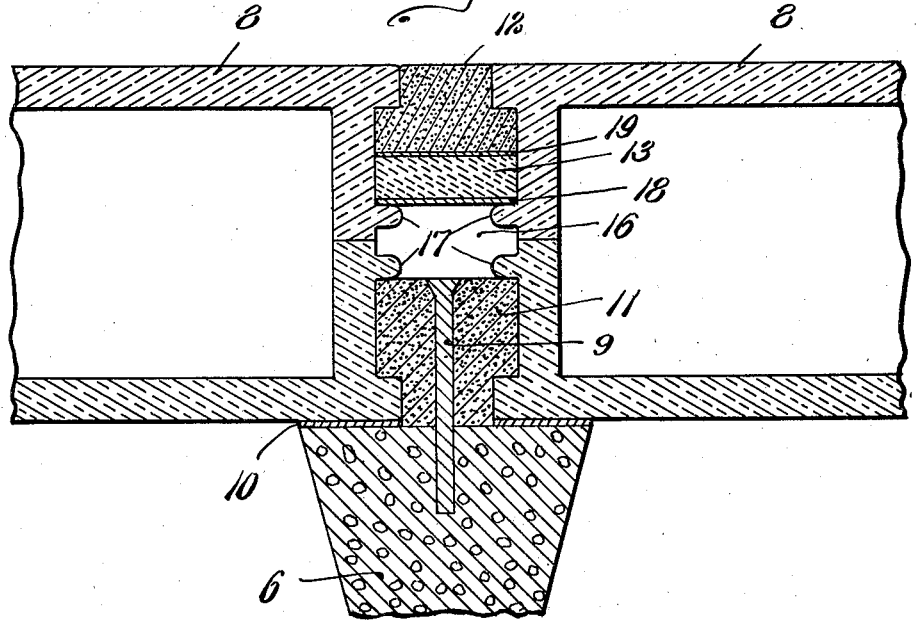

Patented Dec. 12, 1939

2,182,971

UNITED STATES PATENT OFFICE 2,182,971

SKYLIGHT OR FLOORLIGHT CONSTRUCTION

Joshua M. Richards, Brookline, Mass.

Application September 17, 1937, Serial No. 164,305

4 Claims. (Cl. 94—28)

The present invention relates to skylight and floorlight constructions, or the like.

In my application filed February 4, 1936, Serial No. 62,303, I disclosed installations suitable for use as skylights, floorlights, or the like, such that condensation thereon of moisture from the air is prevented or greatly diminished, which obviate the need of gutters to carry away the condensed moisture or ventilation to prevent it, which are air tight and water tight, and which prevent heat losses in winter, and exclude the admission of heat in summer. Characteristic features of these installations comprise a hollow glass block of low thermal conductivity and a supporting and surrounding grid of lower thermal conductivity. In these installations it is highly desirable that the coefficient of heat transfer of the supporting and surrounding grid be lower than that of the hollow glass block. Recently, the method of making the hollow glass block used in the aforesaid installations has been greatly improved to such an extent that the coefficient of heat transfer of the glass block is lower than the supporting and surrounding grid.

In the improved method of making the glass block, duplicate halves of each block are cast in a common mold. The corresponding edges of each of the duplicate halves, after they have been removed from the mold and while they are highly heated from the molding operation, are engaged and pressed together thus forming the hollow block having glass welded joints. The hot air trapped in the hollow block becomes so rarified upon its cooling as to create substantially a vacuum within the block thus reducing materially its thermal conductivity.

The principal object of the present invention is to produce a supporting and surrounding grid, for the improved hollow glass block, the coefficient of heat transfer of which grid will be lower than that of the improved hollow glass block.

To the accomplishment of this object, and such others as may appear hereinafter, the various features of the present invention reside in certain devices, constructions, combinations, and arrangement of parts fully set forth hereinafter and then pointed out in the appended claims.

The various features of the present invention will be readily understood from an inspection of the accompanying drawings, illustrating the best forms of the invention at present known to the inventor, in which, Figure 1 is a view in plan;

Fig. 2 is an enlarged view in sectional elevation taken along the line 2—2, Fig. 1;

Fig. 3 is a detail view in sectional elevation of a modified form of the present invention employing an air space between the bottom of the insulating material and the top of the underlying sealing compound.

Figure 1:
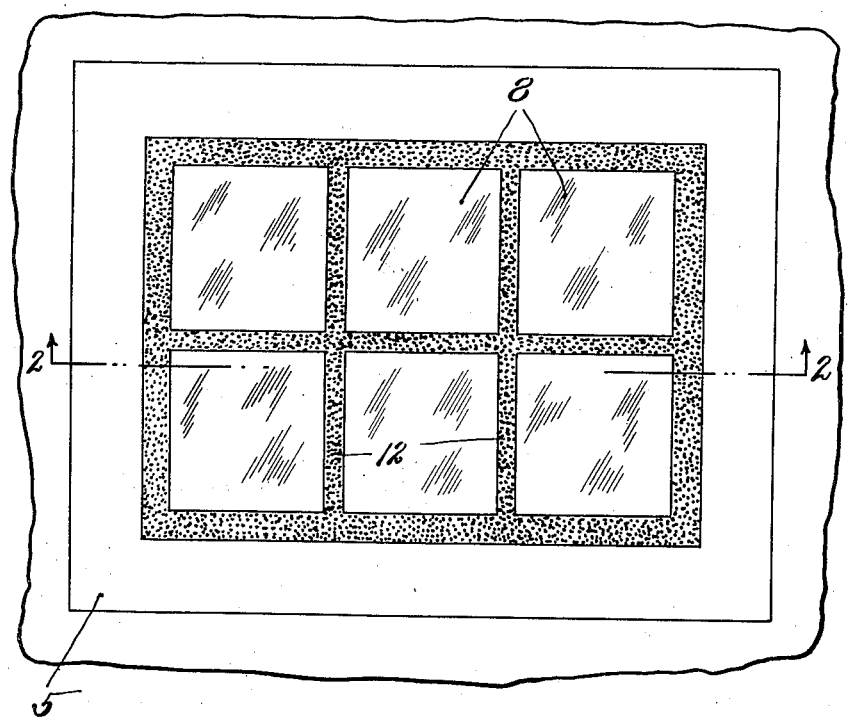

The embodiment of the present invention illustrated in Figs. 1 and 2 comprises a unitary reinforced concrete grid framework provided with a peripheral border portion 5 (Fig. 1), which surrounds an apertured portion or area made up of spaced grid members 6 (Fig. 2) integral with the border and extending transversely and longitudinally thereof, so as to form a plurality of openings 7. The general features of this unitary reinforced concrete construction are old and well known.

The grid construction is adapted to support a plurality of improved light transmitting elements, herein indicated as being hollow glass blocks 8, which are six in number. These hollow glass blocks have an unusually low coefficient of heat transfer.

Figure 4:
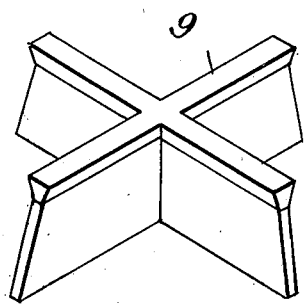
Fig. 4 is a view in perspective of a cross-shaped shield member.

It is highly desirable that the supporting and surrounding grid be so constructed as to have a lower coefficient of heat transfer than the hollow glass blocks. To this end the apertures 7 are made slightly smaller than the glass blocks 8 so that the margins of their bottom faces overlie the margins of the apertures. The corners of the blocks are received by cross shields 9 (Fig. 4), which are adapted to be embedded in the concrete as explained more fully in my Patent No. 2,030,718, February 11, 1936. As shown in Fig. 2 the tops of the shields are on a level well below the tops of the blocks. In assembling the blocks with the concrete grid, the blocks are placed within the shields 9 and are pressed down slightly into a mastic bedding 10, which may cover the concrete between adjacent apertures; but which need not extend beyond the base of the shields along the peripheral border of the apertures considered as a unit. When placed in position the tops of the blocks 8 line in a plane.

In order to secure the blocks 8 firmly in place, and to provide for a coefficient of heat transfer lower than that of the glass blocks, the spaces between adjacent blocks are filled in with two separate layers 11 and 12 of waterproof and slightly elastic compound formed of tar and sulphur, there being a filling 13 of relatively soft insulating material of low thermal conductivity, such as cork, interposed between the layers of sealing compound. As shown in Fig. 2, the layer 11, underlying the filling 13, between the shields and the blocks, extends between the adjacent sides of adjacent blocks in engagement with each and rises upwardly to a line to cover at least the tops of the shields. The top of the layer 12, which overlies and covers the filling 13, terminates in the plane of the tops of the blocks.

Material other than cork may be used for the filling 13, the prime requisites being that it be relatively soft, since it engages the blocks, and that it have a low thermal conductivity, so as to have insulating properties. The requisite requirement that the filling 13 be soft requires the use of waterproof plastics containing volatile oils which tend to escape when exposed to the sun and other weather conditions. Moreover, an extremely soft material is not a practical construction to have exposed upon the top surface of the construction, as such material is readily punctured and tends to track from foot traffic. In the illustrated embodiments of the invention, the layer 13 having a low thermal conductivity, lower than that of the hollow glass block, is protected by the filling 12.

Preferably the bottom face of the filling 13 does not rest upon the top face of the underlying compound 11. As shown in Fig. 2, there is a space 14 between them, which space is filled with rumpled aluminum foil 15, which acts as a support for the filling 13, and provides a multiplicity of air cells in the cavities provided by the folds.

As shown in Fig. 3, a large air space 16 may be provided between the layers 11 and 13 by molding the duplicate halves of the glass block with lateral flanges 17, the upper ones of which act as a support for a sheet of waxed cardboard 18, which in turn acts as a support for the filling 13. It may be desirable to cover the filling 13 with tar paper 19, in order to prevent the compound 12, which is hot when poured, from penetrating the layer 13.

What is claimed as new, is:

1. A skylight, floorlight, or like construction having, in combination, a framework provided with an aperture, a light transmitting element having a lower coefficient of heat transfer than the light transmitting element for the aperture, a shield for the light transmitting element secured to the framework, insulating material surrounding the element and overlying the shield, and two separate layers of sealing compound surrounding the light transmitting element and underlying and overlying the insulating material, respectively.

2. A skylight, floorlight, or like construction having, in combination, a framework provided with an aperture, a light transmitting element having a low coefficient of heat transfer for the aperture, a shield for the light transmitting element secured to the framework, insulating material having a lower coefficient of heat transfer than the light transmitting element surrounding the element and overlying the shield in spaced relation thereto, and two separate layers of sealing compound surrounding the light transmitting element and underlying and overlying the insulating material, respectively.

3. A skylight, floorlight, or like construction having, in combination, a framework provided with an aperture, a light transmitting element having a low coefficient of heat transfer for the aperture, a shield for the light transmitting element secured to the framework, insulating material having a lower coefficient of heat transfer than the light transmitting element surrounding the element and overlying the shield in spaced relation thereto, and two separate layers of sealing compound surrounding the light transmitting element and underlying and overlying the insulating material, respectively, the bottom of the insulating material and the top of the underlying sealing compound being spaced from each other.

4. A skylight, floorlight, or like construction having, in combination, a framework provided with an aperture, a light transmitting element for the aperture, a shield for the light transmitting element secured to the framework, insulating material surrounding the light transmitting element and overlying the shield in spaced relation thereto, and two separate layers of sealing compound surrounding the light transmitting element and underlying and overlying the insulating material, respectively, the bottom of the insulating material and the top of the underlying sealing compound being spaced from each other, said space being filled with fold forming material.

JOSHUA M. RICHARDS.